P. SMITH.
FASTENING MEANS FOR TIRE GRIPS.
APPLICATION FILED OCT. 23, 1917.
1,269,328.
Patented June 11, 1918.
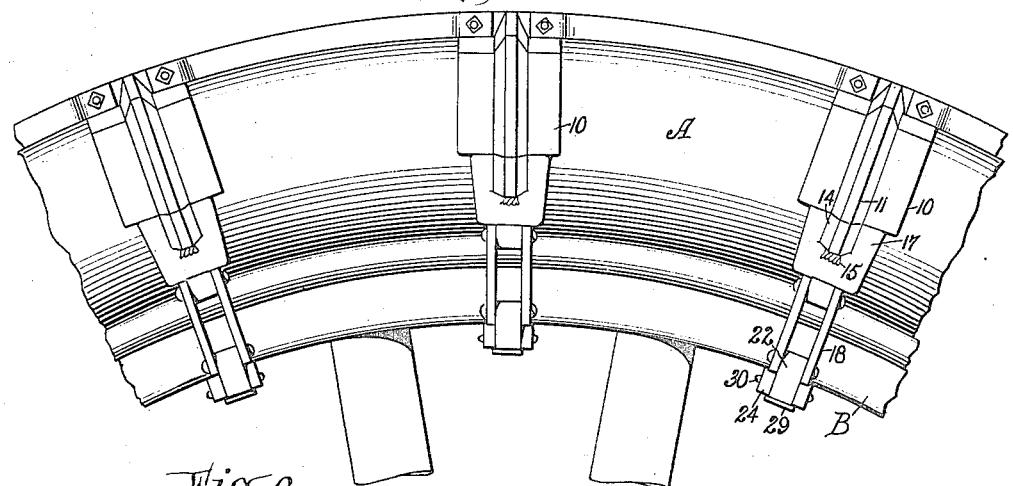
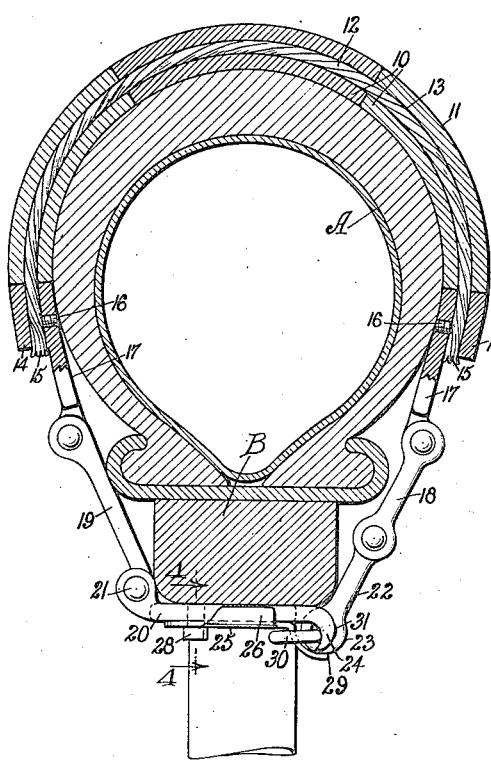
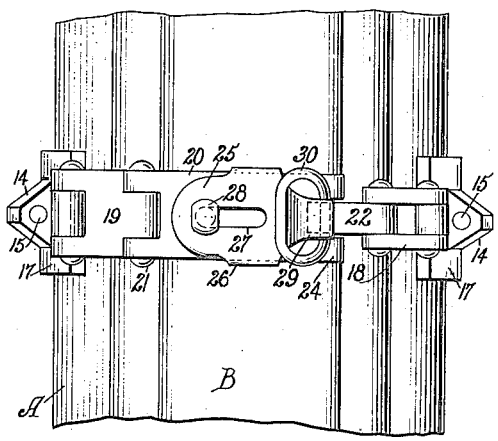
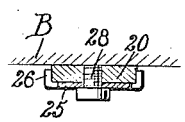
WITNESSES
Frederick Diehl
INVENTOR
P. Smith
BY
ATTORNEYS

UNITED STATES PATENT OFFICE.

PATRICK SMITH, OF FORESTHILL, CALIFORNIA.

FASTENING MEANS FOR TIRE-GRIPS.

1,269,328.

Specification of Letters Patent.

Patented June 11, 1918.

Application filed October 23, 1917. Serial No. 198,109.

*To all whom it may concern:*

Be it known that I, PATRICK SMITH, a citizen of the United States, and a resident of Foresthill, in the county of Placer and State of California, have invented a new and Improved Fastening Means for Tire-Grips, of which the following is a full, clear, and exact description.

My invention relates to a means for fastening attachable grips to automobile tires and more particularly the invention is intended for use in securing a grip of the character disclosed in an application for patent filed by me October 20th, 1916, Serial No. 126,709.

The prime object of the present invention is to provide a fastening means adapted to be disposed transversely beneath the wheel felly and arranged to be fastened or unfastened with facility and despatch to secure the grip in position or to permit its ready removal.

Reference is to be had to the accompanying drawings forming a part of this specification in which similar reference characters indicate corresponding parts in all the views, it being understood that the drawings are merely illustrative of one example of the invention.

Figure 1 is a side elevation of a portion of a wheel and tire showing my attachment applied thereto;

Fig. 2 is a cross section;

Fig. 3 is a view taken at the inner side of the felly showing a face view of my improved fastening means;

Fig. 4 is a detail in section on the line 4—4, Fig. 2.

The grips for which my fastening means is more particularly intended are separately applied to the tire in any desired number. Each grip is composed of separate curved members 10, the curvature corresponding with the curve of the tire shoe A. Each member 10 of each grip or gripping section in the illustrated example is formed with a beveled rib 11. The members 10 of each grip are flexibly connected through the medium of a transverse cable 12 preferably of wire, the cable being accommodated in registering bores 13 in the respective members 10. The cable 12 at each end passes through a block 14 and any suitable fastening means is employed, as for example, the projecting end 15 of the cable may be soldered. I have shown also a transverse set screw 16 extending through the inner face of the block 14 to bear against the cable.

To secure the grip in position suitable links or equivalent means are provided at each side and connected with the blocks 14, the links or the like at each side being adapted to be secured by my improved fastening means that extend at the inner side of the felly B. In the form shown each block 14 has an arm 17, one arm 17 carrying a link 18 and the opposite arm, a link or strap 19. I provide a latch plate 20 adapted to lie against the inner face of the felly B, said plate being pivoted at one end as at 21 to the element 19 and the opposite end of said latch plate is adapted to engage a fastener bar 22 having a head 23 which is received between the spaced arms of a hooked fork 24 formed on the said latch plate 20. The latch plate 20 is provided with a latching slide 25 which is formed with side flanges 26 giving the slide guided movement on the said latch plate. The slide 25 is formed with a longitudinal slot 27 and the plate 20 has a screw 28 extending through said slot and having an enlarged head beneath which the slide is held, said head having opposite flattened sides or otherwise formed to receive a wrench to give the screw a slight turn for permitting the slide 25 to move longitudinally or to bind against the slide for holding it in the latching position. The terminal 29 of the slide 25 adjacent to the hooked arms 24 is formed on said slide and curved oppositely to the arms 24. The head 23 carries a loop 30 extending loosely through a transverse hole 31 in said head so that the loop may have a swinging movement. The ends of the loop 30 at the sides of the head 23 extend sufficiently to be engaged by the hooked arms 24.

With the described construction the grip having been placed on the tire, in order to fasten the grip the loop 30 is swung to the dotted line position indicated in Fig. 2 and the slide 25 is slid in a direction to move the latching terminal 29 thereof away from the hooked arms 24, thereby permitting the head 23 to be passed between the hooked arms and the loop 30 to be engaged by said arms. The slide 25 is then moved to bring the terminal 29 adjacent to the members 24 and the loop 30 may then be swung over the said terminal 29 as indicated in the full line position, Fig. 2. The full line position of the terminal 29 holds the head 23 and its loop 30 against retrograde movement. The prime office of the loop 30 is to effect engagement with the hooked arms 24 and incidentally it facilitates the manipulation of the parts in fastening and unfastening. Usually the loop 30 will be maintained by friction of the parts in the full line position of Fig. 2 but its swinging to the dotted line position will not affect the fastening since the screw 28 positively holds the slide 25 in proper relation to the hook elements 24.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. The herein described fastening means for tire grips, including a latch plate adapted at one end for connection with the grip at one side of the latter, spaced hooked arms on the opposite end of said plate, a latch slide on said plate, that end of the slide adjacent to the said hooked arms having a latching terminal curved oppositely to the said arms, means to lock the said slide against movement, a bar adapted at one end for connection with the grip at the opposite side of the latter from that carrying the latch plate, said bar having a head formed with a transverse hole, and a loop extending at a side thereof through the said hole, the said head being receivable between the hooked arms of the latch plate and the loop projecting at the sides of the head to be engaged by the said hooked arms, the curved latching terminal of the slide being movable with the latter adjacent to or from the hooked arms, and adapted to extend through the said loop.

2. In a fastening means of the class described, a latch element adapted to be secured at one end to the grip at one side of the latter and formed at the opposite end with spaced hooked arms, a latch bar adapted to be secured to the grip at the opposite side from said element, said bar having a head receivable between said hooked arms, a sliding member on the said latch element and formed with a latching terminal to co-act with said hooked arms, and a transverse element on said head and projecting at opposite sides thereof to be engaged by the said hooked arms when the head is positioned between the latter.

PATRICK SMITH.